Patented July 17, 1934

1,966,513

UNITED STATES PATENT OFFICE 1,966,513

FREE FLOWING POWDERED MILK

Henry V. Moss and Thomas H. Wheelock, St. Louis, Mo., assignors to Swann Research Incorporated, a corporation of Alabama No Drawing. Application August 8, 1932, Serial No. 627,986. Renewed May 9, 1934

9 Claims. (Cl. 99—11)

This invention relates to free flowing powdered whole milk, skimmed milk, or buttermilk, and more particularly to means whereby dried milk powder may be made free flowing and may be retained in a non-caking condition on long periods of storage.

Previous methods of attaining this end have consisted in rapidly cooling the milk after drying or in packing the dried milk in air tight metal containers. These practices, however, have only been partially successful and caking is not eliminated; more particularly when the metal containers are opened and the contents are held in the open container for a period of time while it is being used.

We have now discovered that dry skimmed or whole milk powder may be prevented from caking, and in the case of skimmed milk powder to retain its original free flowing property, while in the case of whole milk powder, which originally is not free flowing, we are able to impart a free flowing property by incorporating with the finely divided milk powder 2 to 6% of finely divided tri-calcium phosphate. While ordinary tri-calcium phosphate may be effectively employed for this purpose, somewhat better results are obtained by using a tri-calcium phosphate containing say 3 to 7% of aluminum phosphate or one which contains more CaO than required to satisfy the formula $Ca_3(PO_4)_2$, and which is consequently more basic than pure tri-calcium phosphate. Usually up to 1 to 2% excess lime will be found sufficient for all practical purposes.

As a result of experiments made to determine the efficiency of tri-calcium phosphate as a caking inhibitor we have found that the addition of ½% of tri-calcium phosphate will increase the rate of flow through a standard powder flow meter of whole powdered milk from 2 grams per minute to 99 grams per minute, and that the addition of 2% tri-calcium phosphate to whole powdered milk will further increase its rate of flow to 127 grams per minute. We have further determined experimentally that skimmed and whole milk powders cake when exposed to a moist atmosphere and are subsequently dried, and that by the addition of from 1% to 6% of pure tri-calcium phosphate—or preferably a tri-calcium phosphate containing 3 to 7% aluminum phosphate and being more basic than theoretical $Ca_3(PO_4)_2$—caking is markedly diminished. A further advantage which we have discovered is that the skimmed and whole milk powders containing from 2% to 6% tri-calcium phosphate, as described, are more easily mixed with water or other liquids and show less tendency to form lumps or agglomerates. We have still further determined that the incorporation of tri-calcium phosphate in milk powders does not deleteriously affect the quality of biscuits, cakes or bread in which the milk containing tri-calcium phosphate is used.

In order that others may practice our invention, we will described a preferred manner in which it may be carried out:—

To 80 pounds of dry powdered skimmed milk add 20 pounds of finely divided tri-calcium phosphate. Mix these materials intimately in a mechanical mixer and sift the mixture thru a 65 mesh screen. To 900 pounds of dry powdered skimmed milk add the above mixture consisting of 80 pounds of dry powdered skimmed milk and 20 pounds of finely divided tri-calcium phosphate, thus giving a total of 1000 pounds in which 2% of tri-calcium phosphate is contained. Mix this intimately in a mechanical mixer and pack in suitable containers. In order to effectively prevent caking in whole milk powder we find it desirable to use a larger quantity of tri-calcium phosphate, and we therefore use such proportions as to give 4% of tri-calcium phosphate in the final mixture. For instance, 60 pounds of dry whole milk powder and 40 pounds of finely divided tri-calcium phosphate after first mixed and sifted as described above are then added to 900 pounds of whole milk powder. While we prefer to use the proportions given above, we may vary these to give between 5% and 6% tri-calcium phosphate in the final mixture and we may further make the final mixture by the direct addition of the required amount of tri-calcium phosphate to the whole quantity of milk powder with the preliminary mix.

Having now particularly described our invention, what we claim is:—

1. Powdered milk containing tri-calcium phosphate in caking inhibiting proportions.

2. Powdered skimmed milk containing between ½ and 6 percent tri-calcium phosphate.

3. Powdered whole milk containing between ½ and 6 percent tri-calcium phosphate.

4. Powdered milk containing a caking inhibitor comprising tri-calcium phosphate containing 3 to 7 percent aluminum phosphate.

5. Powdered milk containing a caking inhibitor comprising tri-calcium phosphate containing from 3 to 7 percent aluminum phosphate and containing more CaO than required to satisfy the formula $Ca_3(PO_4)_2$.

6. Powdered milk containing tricalcium phosphate in caking inhibiting proportions, said tricalcium phosphate being more basic than the compound $Ca_3(PO_4)_2$.

7. Powdered milk containing tricalcium phosphate in caking inhibiting proportions, said tricalcium phosphate containing an excess of up to 2% CaO over that contained in the pure compound, $Ca_3(PO_4)_2$.

8. Powdered milk containing tricalcium phosphate in caking inhibiting proportions, said tricalcium phosphate having associated therewith a material selected from the class consisting of aluminum phosphate in proportion of from 3 to 7% of said tricalcium phosphate; lime up to 2% in excess of that contained in the pure compound, $Ca_3(PO_4)_2$.

9. Powdered whole milk which is free flowing and which contains a caking inhibitor, said inhibitor comprising tricalcium phosphate in such proportions as to cause the product to retain free flowing properties on storage.

THOMAS H. WHEELOCK.
HENRY V. MOSS.